United States Patent [19]

Le Fol

[11] Patent Number: 4,767,107
[45] Date of Patent: Aug. 30, 1988

[54] CENTRAL SUSPENSION HYDROELASTIC MOUNT, IN PARTICULAR FOR THE SUSPENSION OF A MOTOR-VEHICLE MOTOR-DRIVE UNIT

[75] Inventor: Marcel Le Fol, Chateaugiron, France

[73] Assignees: Automobiles Peugeot, Paris; Automobiles Citroen, Neuilly-sur-Seine, both of France

[21] Appl. No.: 7,475

[22] Filed: Jan. 28, 1987

[30] Foreign Application Priority Data

Jan. 30, 1986 [FR] France .................................. 86 01309

[51] Int. Cl.⁴ ........................ B60G 11/62; F16M 7/00; F16M 1/02; F16M 5/00
[52] U.S. Cl. .................................. 267/140.1; 267/35; 267/141.4; 248/562
[58] Field of Search ...................... 267/140.1, 35, 8 R, 267/141.4, 141.5; 248/562, 636; 188/298; 180/300, 312

[56] References Cited

U.S. PATENT DOCUMENTS

| | | |
|---|---|---|
| 2,226,388 | 12/1940 | Richter . |
| 2,387,066 | 10/1945 | Harding . |
| 2,540,130 | 2/1951 | Lee . |
| 3,202,388 | 8/1965 | Goodwin . |
| 3,586,403 | 6/1971 | Cooley . |
| 3,651,902 | 3/1972 | Peddinghaus . |
| 3,731,771 | 5/1973 | Borgo . |
| 3,795,390 | 3/1974 | Kendall et al. . |
| 3,958,654 | 5/1976 | Le Salver et al. . |
| 3,970,162 | 7/1976 | Le Salver et al. . |
| 4,054,277 | 10/1971 | Sirven . |
| 4,159,091 | 6/1979 | Le Salver et al. . |
| 4,215,842 | 8/1980 | Brenner et al. . |
| 4,262,886 | 4/1981 | Le Salver et al. . |
| 4,274,655 | 6/1981 | Lederman ........................... 267/8 R |
| 4,277,056 | 7/1981 | Ticks . |
| 4,319,768 | 3/1982 | Youngdale . |
| 4,336,968 | 6/1982 | Hibner . |
| 4,422,779 | 12/1983 | Hamaekers et al. . |
| 4,519,211 | 5/1985 | Sedille et al. . |
| 4,568,069 | 2/1986 | Poupard . |
| 4,588,173 | 5/1986 | Gold et al. . |
| 4,657,232 | 4/1987 | West .................................. 267/140.1 |

FOREIGN PATENT DOCUMENTS

| | | |
|---|---|---|
| 0014742 | 9/1980 | European Pat. Off. . |
| 0027751 | 4/1981 | European Pat. Off. . |
| 0036470 | 9/1981 | European Pat. Off. . |
| 0044908 | 2/1982 | European Pat. Off. . |
| 0071698 | 4/1982 | European Pat. Off. . |
| 0072262 | 2/1983 | European Pat Off. . |
| 01638817 | 12/1985 | European Pat. Off. . |

(List continued on next page.)

OTHER PUBLICATIONS

Report "Theory of the Hydraulically Damped Motor Munt with a Long Nozzle".
Report Comparing Motor Munts.
Drawing Dated Oct. 5, 1979 with Attachments.
Freudenberg Drawing 10780 Dated Nov. 2, 1979.
"The Use of Engine Mounts with Integrated Hydraulic Damping in Passenger Cars", Presented by Le Salver, 1983.

Primary Examiner—Andres Kashnikow
Assistant Examiner—Richard Potosnak
Attorney, Agent, or Firm—Burns, Doane, Swecker & Mathis

[57] ABSTRACT

A hydroelastic mount for interposition between two units to be insulated from each other, for example a motor-drive unit and the structure of a motor vehicle, the mount comprising an elastic mass (1) disposed between two carrying armatures (17, 18), two chambers (6, 12) which are filled with liquid, interconnected by a communication passageway (8) and at least partly defined by elastic walls (1, 13). The two chambers (6, 12) have an annular shape and the mount defines a central empty space (21) for the passage of a connecting rod (20) between one of the carrying armatures (18) and the unit to which it is connected. This arrangement simplifies the assembly when the unit to be insulated is placed thereunder.

7 Claims, 2 Drawing Sheets

FOREIGN PATENT DOCUMENTS

| | | |
|---|---|---|
| 547194 | 2/1934 | Fed. Rep. of Germany . |
| 728501 | 11/1942 | Fed. Rep. of Germany . |
| 1625389 | 7/1970 | Fed. Rep. of Germany . |
| 7407909 | 5/1977 | Fed. Rep. of Germany . |
| 2948408 | 6/1981 | Fed. Rep. of Germany . |
| 926846 | 10/1947 | France . |
| 1242350 | 8/1960 | France . |
| 1336186 | 7/1963 | France . |
| 1380784 | 10/1964 | France . |
| 1540380 | 9/1968 | France . |
| 1549300 | 11/1968 | France . |
| 2349066 | 11/1977 | France . |
| 2394715 | 1/1979 | France . |
| 2435632 | 4/1980 | France . |
| 2547378 | 6/1984 | France . |
| 2555272 | 5/1985 | France . |
| 0143830 | 11/1981 | Japan . |
| 0172743 | 7/1985 | Japan . |
| 0176802 | 9/1985 | Japan . |
| 0208652 | 10/1985 | Japan . |
| 811748 | 4/1959 | United Kingdom . |
| 2041486 | 9/1980 | United Kingdom . |
| 2041485 | 9/1980 | United Kingdom . |
| 2086530 | 5/1982 | United Kingdom . |
| 2166516 | 5/1986 | United Kingdom . |

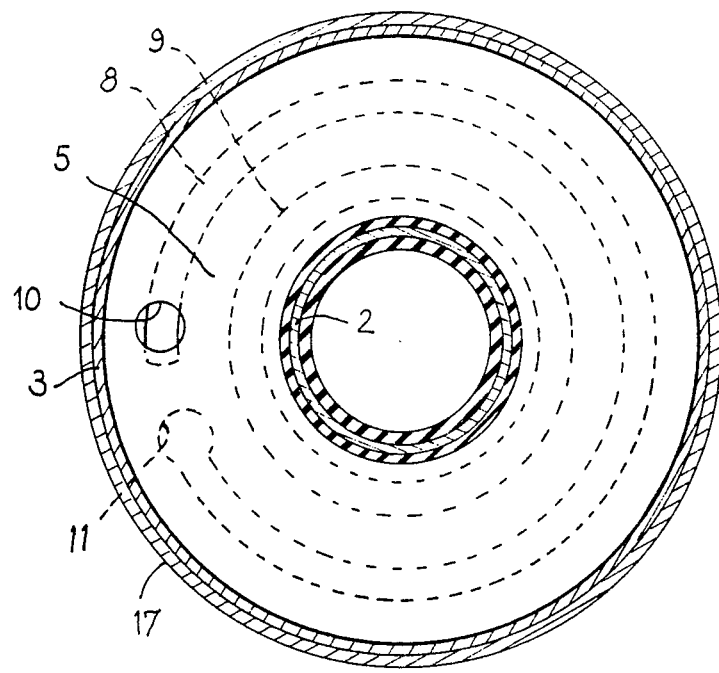
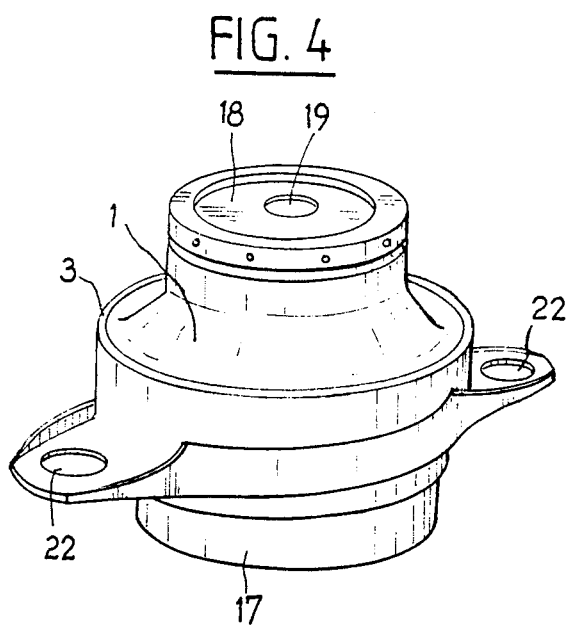
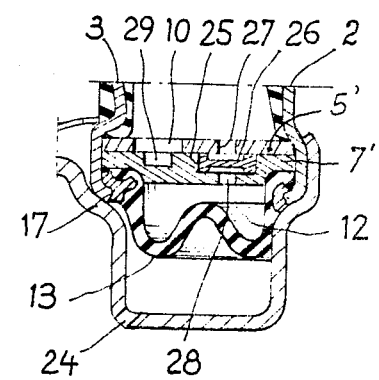

CENTRAL SUSPENSION HYDROELASTIC MOUNT, IN PARTICULAR FOR THE SUSPENSION OF A MOTOR-VEHICLE MOTOR-DRIVE UNIT

The invention relates to a hydroelastic mount or interposed structure for connecting to a rigid support an element or a unit on which there are exerted excitations of different types. As an example of their application, these mounts may be used for the suspension of a motor-drive unit relative to the structure of a motor vehicle.

It is known that, in a motor vehicle, the elastic mounts used for the suspension of the motor-drive unit must effect both a good filtering of vibrations of high frequency and small amplitude, due to imperfect balancing of the engine, and a good damping of the tremblings of low frequency and large amplitude coming from the road.

This double result may be obtained in a known manner with a mount of the type comprising two chambers filled with liquid partly defined by elastic walls and interconnected by a communication passageway. These mounts are normally provided for placing under the element or the unit to be insulated. But if the latter is placed under the mount an overhanging assembly must be provided with a bracket so as to place the load above the mount.

An object of the invention is to provide a mount which considerably simplifies the assembly when the element to be insulated is placed thereunder.

The invention therefore provides a hydroelastic mount for interposition between two units to be insulated from each other, comprising an elastic mass disposed between two carrying armatures, two chambers filled with liquid, and interconnected by a communication passageway being at least partly defined by elastic walls.

In the mount according to the invention, the two chambers are of annular shape, the mount defining a central empty space for the passage of a connecting rod between one of the armatures and the unit to which it is connected.

An embodiment of the invention will now be described with reference to the accompanying drawings in which :

FIG. 3 is a sectional view taken on line III—III of Fig.1 ;

FIG. 4 is a perspective view of the mount of FIGS. 1 to 3, and

FIG. 5 is a partial sectional view of a modification of the mount.

Figure 1:
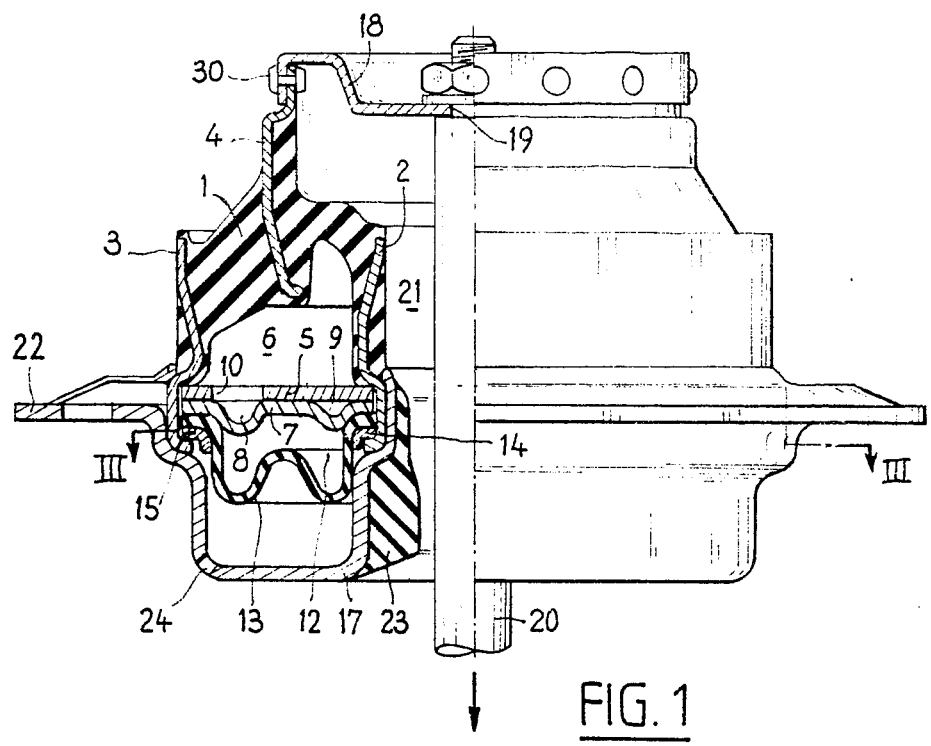
FIG. 1 is a semi-elevational, semi-axial sectional view of a first embodiment of a mount according to the invention.

The illustrated mount comprises a mass or block 1 of elastomer bonded or otherwise adhered to an inner armature 2, an outer armature 3 and an intermediate armature 4. This mass 1 defines with a first rigid annular disc 5 a work chamber 6 of annular shape.

The disc 5 is disposed flat against a second rigid annular disc 7, on which are formed two concentric grooves 8,9. The groove 8 extends in a little less than a circumference. One of its ends is placed in facing relation to an orifice 10 in the disc 5 and its other end communicates, through an orifice 11, with an annular expansion chamber defined by the disc 7 and an elastic membrane 13. The groove 8 thus constitutes a communication passageway of great length between the two chambers 6 and 12.

The elastic membrane 13 bordered by armatures 14, 15 is maintained with the discs 5, 7, by the setting or forming over of the armatures 2 and 3, this maintenance being improved by the presence of the grooves 8 and 9.

Figure 2:
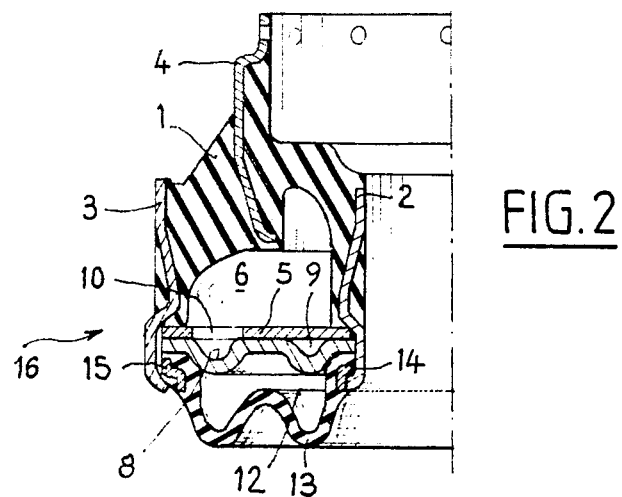
FIG. 2 is a semi-axial sectional view of the sub-unit comprising the two chambers filled with liquid.

The components just described are assembled, in the conventional manner, in the state of immersion in an anti-freeze liquid so as to form the sub-assembly or the sub-unit shown in FIG. 2.

This sub-unit is then completed with a lower carrying armature 17 and an upper carrying armature 18.

The upper carrying armature 18 is secured on its periphery, by welding, riveting (rivets 30, FIG. 1) or any other means, to the intermediate armature 4. It comprises a central opening 19 for the fixing of a rod 20 which extends through a central empty space 21 of the mount and from which is suspended a structure to be insulated (not shown).

The lower carrying armature 17 is set or formed over internally and externally with respect to the sub-unit 16. It comprises ears 22 for fixing the armature to a support (not shown). A layer 23 of elastomer may be disposed inside the armature 17 to act as a transverse abutment relative to the rod 20. At least one orifice 24 puts the interior of the armature 17 in communication with the atmosphere.

In the modification shown partly in FIG. 5, the annular discs 5' and 7' respectively correspond to the annular discs 5 and 7 of the first embodiment. The disc 7' comprises a circular groove 25 in which is mounted a flexible washer 26, and orifices 27, 28 formed in the discs 5' and 7' put either side of the flexible washer in communication with the chamber 6 or 12. The second groove 29 corresponds to the groove 8 of the foregoing embodiment. This flexible washer performs a function of a movable partition having a limited displacement whose advantages are well known (see in particular French Pat. No. 79 26 137).

What is claimed is :

1. A hydroelastic mount for interposition between two units to be insulated from each other, for example a motor-drive unit and a structure of a motor vehicle, said mount comprising two carrying armatures, an elastic mass disposed between said armatures, means including a first elastic wall defining an annular work chamber and means including a second elastic wall defining an annular expansion chamber, a liquid filling said chambers, a communication passageway putting said chambers in communication with each other, the mount defining a central empty space, a connecting rod extending through said empty space for connecting one of said carrying armatures to a unit to which it is connected, an outer armature, an inner armature and an intermediate armature, one of the carrying armatures being directly attached to said intermediate armature to which there is bonded or otherwise adhered the elastic mass between said inner armature and said outer armature, the connecting rod being directly attached to the carrying armature which is directly attached to said intermediate armature, two annular discs separating said chambers, the second elastic wall including an elastic membrane which partly defines said expansion chamber being maintained with said annular discs by a setting operation effected on said inner and outer armatures.

2. A hydroelastic mount according to claim 1, wherein the annular discs separating the chambers a first rigid annular disc provided with a first orifice, and a second rigid annular disc disposed flat against the first annular disc and having a second orifice and at least one partly circular groove which communicates by an end of said groove with one of the chambers through said first orifice, an opposite end of said groove communicating through said second orifice with the second chamber, the groove constituting a communication passageway of great length between said two chambers.

3. A mount according to claim 1, further comprising armatures bordering said elastic membrane.

4. A mount according to claim 2, wherein one of said rigid annular discs includes a circular recess, a flexible washer being disposed in said recess in facing relation to the other rigid disc, orifices provided in the annular disc ensuring the communication of either side of said flexible washer with one of the chambers.

5. A mount according to claim 2, wherein a setting operation connects one of the carrying armatures internally and externally to a sub-unit comprising said elastic mass, said inner armature, said outer armature and said intermediate armature, said rigid annular discs and said flexible membrane.

6. A hydroelastic mount for interposition between two units to be insulated from each other, for example a motor-drive unit and a structure of a motor vehicle, said mount comprising two carrying armatures, an elastic mass disposed between said armatures, means including an elastic wall defining an annular work chamber and means including an elastic wall defining an annular expansion chamber, a liquid filling said chambers, a communication passageway putting said chambers in communication with each othr, the mount defining a central empty space, a connecting rod directly attached to one of said carrying armatures and extending through said empty space for connecting one of said carrying armatures to a unit, an outer armature, an inner armature and an intermediate armature, one of the carrying armatures being directly attached to said intermediate armature to which there is bonded or otherwise adhered the elastic mass between said inner armature and said outer armature, two annular discs separating said chambers, an elastic membrane which partly defines said expansion chamber being maintained with said annular discs by a setting operation effected on said inner and outer armatures;

wherein the annular discs separating the chambers comprise a first rigid annular disc provided with a first orifice, and a second rigid annular disc disposed flat against the first annular disc and having a second orifice and at least one partly circular groove which communicates by an end of said groove with one of the chambers through said first orifice, an opposite end of said groove communicating through said second orifice with the second chamber, the groove constituting a communication passageway of great length between said two chambers;

wherein one of said rigid annular discs includes a circular recess, a flexible washer being disposed in said recess in facing relation to the other rigid disc, orifices provided in the annular disc ensuring the communication of either side of said flexible washer with one of the chambers; and wherein a setting operation connects one of the carrying armatures internally and externally to a sub-unit comprising said elastic mass, said inner armature, said outer armature and said intermediate armature, said rigid annular discs and said flexible membrane.

7. A hydroelastic mount for interposition between two units to be insulated from each other, for example a motor-drive unit and a structure of a motor vehicle, said mount comprising:

an upper carrying armature, a lower carrying armature, an elastic mass disposed between said armatures under compression loading, means including a first elastic wall defining an annular work chamber, means including a second elastic wall defining an annular expansion chamber, a liquid filling said chambers, a communication passageway putting said chambers in communication with each other, the mount defining a central empty space, a connecting rod extending through said empty space, for connecting said upper carrying armature to a unit which it suspends, an outer armature, an inner armature and an intermediate armature, the upper carrying armature being directly attached to said intermediate armature to which there is bonded or otherwise adhered the elastic mass between said inner armature and said outer armature, the connecting rod being directly attached to the upper carrying armature directly attached to said intermediate armature, two annular discs separating said chambers, an elastic membrane which partly defines said expansion chamber being maintained with said annular discs by a setting operation effected on said inner and outer armatures.

* * * * *